INVENTOR.
MONTGOMERY KNIGHT
THOMAS E. MOODIE
BY *T. Edward P. Moodie*
ATTORNEY.

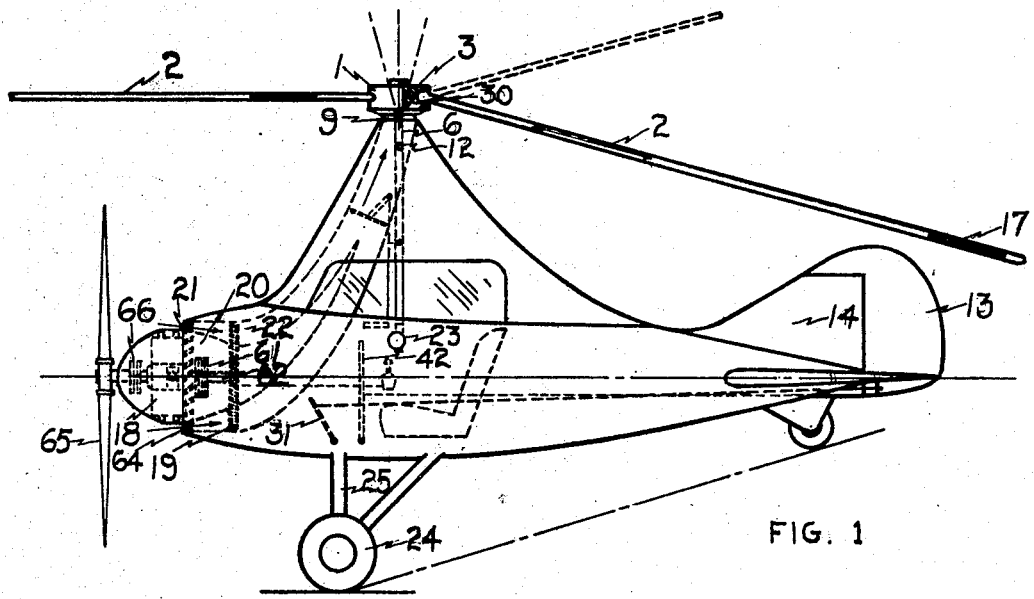
FIG. 1
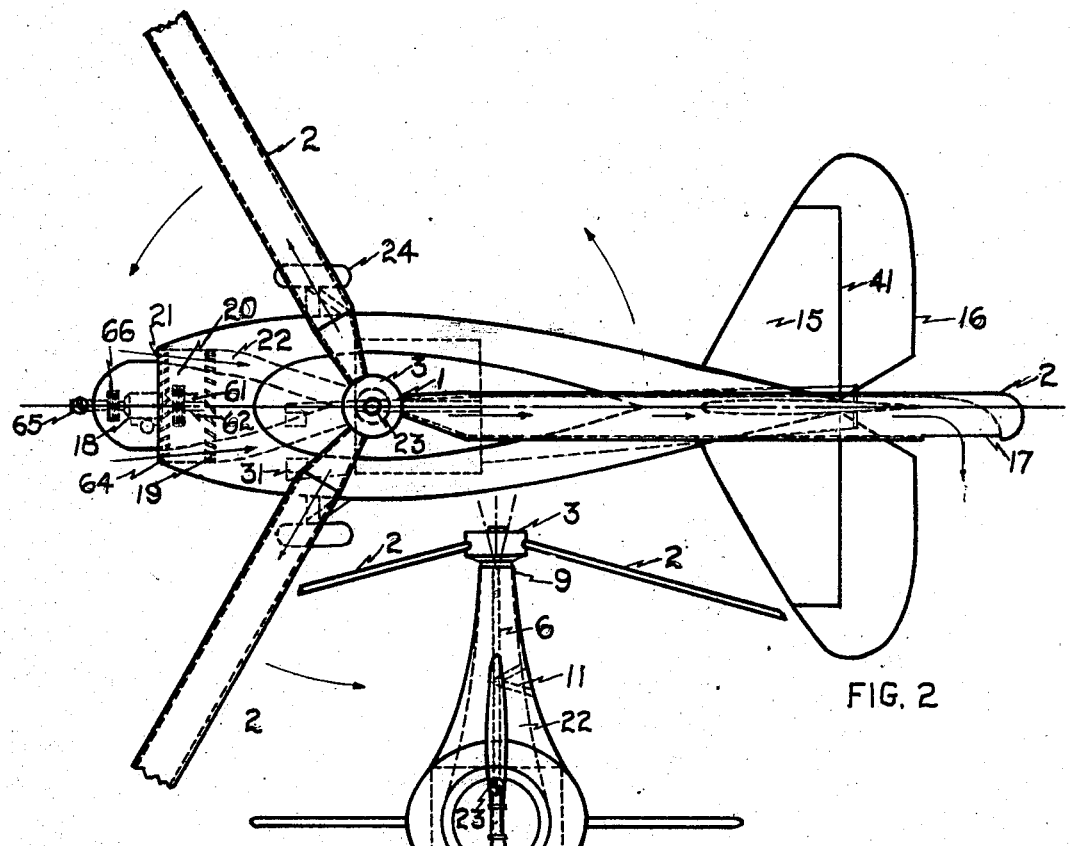
FIG. 2
FIG. 3
INVENTOR.
MONTGOMERY KNIGHT
THOMAS E. MOODIE
BY T. Edward Moodie
ATTORNEY.

Patented Sept. 7, 1937

2,092,077

UNITED STATES PATENT OFFICE 2,092,077

ROTATING WING AIRCRAFT

Montgomery Knight and Thomas Edward Moodie, Atlanta, Ga.

Application January 23, 1936, Serial No. 60,376

3 Claims. (Cl. 244—18)

This invention as well as the invention disclosed in our copending application No. 45,951 relates to a new type of aircraft which is capable of moving through the air in any desired direction. The objects of the invention are to provide a heavier-than-air aircraft of the following characteristics:

1. The ability to ascend or descend vertically or along a flight path of any desired angle.
2. The ability to proceed as slowly as desired.
3. The ability to fly backwards in the air under full control and without loss in altitude.
4. Inherent stability sufficient to maintain the craft in proper flying attitude at all times.
5. The ability to maintain complete control and to descend along any desired path and land in case of engine failure.
6. Provision of a type of lifting means suited to either vertical ascent or descent as well as to horizontal or inclined flight.
7. Provision of a type of lifting surface which has a minimum of weight.
8. Provision of a form of rotor drive in which the torque reaction is small and may be made to act about any desired axis.
9. Provision of a form of rotor which is substantially free from all gyroscopic effects.
10. Provision of a jet propulsive system utilizing warm air, and so combined with the rotor blades as to maintain their temperature above the freezing point of water or water vapor, thus preventing dangerous ice formation in flight.
11. Provision of a form of rotor propulsive system which is substantially free from gyroscopic effects.
12. Provisions of a means of tilting the rotor axis so that the thrust vector from the rotor may be inclined in any desired direction at the will of the pilot, thus causing the ship to pitch and/or roll as desired.
13. Provision of a form of lateral and longitudinal control which is absolutely independent of forward speed.

The general principles of the preferred embodiment of the invention are described in the following specifications and illustrated in the accompanying drawings. The broad scope of the invention is particularly set forth in the appended claims.

Referring now to the drawings in which like characters of reference are used throughout the several views.

Figure 1 is a side view of the preferred form of the invention.

Fig. 2 is a top plan view of the preferred form of the invention.

Fig. 3 is a front view of the preferred form of the invention.

General arrangement

Figure 4:
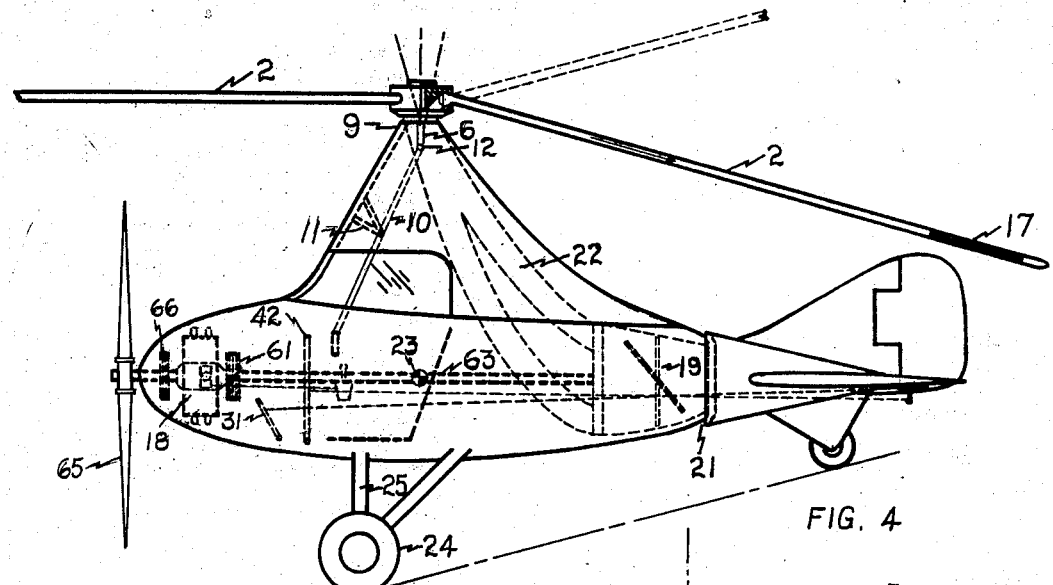
Fig. 4 is a side view of a modified form of the invention.

The general arrangement of the preferred embodiment of the invention is shown in Figure 1 in which 1 indicates the rotor system which is used for lift and control. This rotor consists of a plurality of hollow blades 2 pivoted to a rotor head or hub 3. The blades 2 may have any suitable airfoil contour and may be tapered or otherwise modified in plan form or may have a simple rectangular plan form as shown. The blades 2 are attached to the rotor head or hub by means of horizontal, or substantially horizontal hinge pins 4. It will be seen that each blade is free to rotate individually about its hinge pin 4 and may assume such a flapping angle as may be required to put in equilibrium the forces which are acting on it at any instant. The forces which act on the blades are principally centrifugal force and aerodynamic lift and drag although blade weight and inertia forces do have a slight effect.

Figure 7:
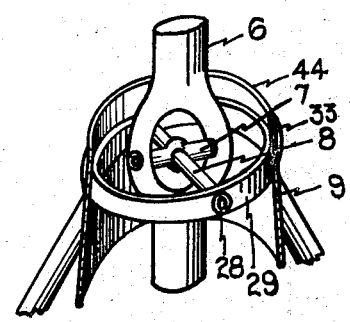
Fig. 7 is a perspective view showing one form of construction which may be used for the tilting rotor mast.
Figure 5:
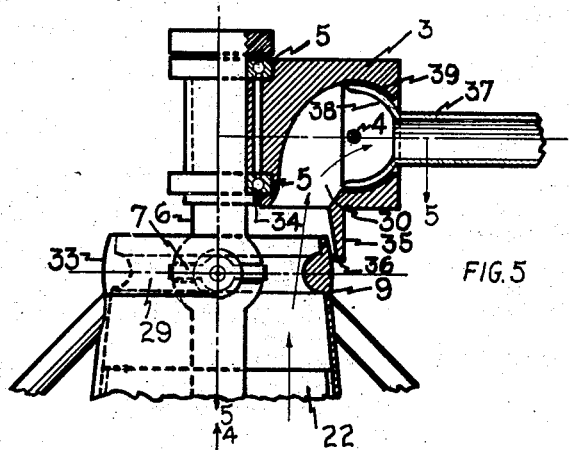
Fig. 5 is a partial sectional view in elevation of a portion of the rotor head showing the air ducts and the method of attaching the rotor blades to the rotor head. This section is taken along the line 5—5 Fig. 6.

The rotor head or hub is mounted upon ball or roller bearings 5 of any suitable form and arrangement. The bearings 5 are in turn mounted upon a non-rotatable shaft or mast 6 which is mounted in a gimbal ring assembly A. By reference to Figure 7 the details of this construction will be clearly evident. In this figure the mast 6 is branched or cut away at its center portion and a gimbal pin 7 is mounted therein and rotatably with respect thereto. The gimbal pin 7 is in turn mounted on a short shaft 8 which is mounted in the rigid pylon structure 9. It will be noted that the gimbal pin 7 may be free to rotate on the shaft member 8 or it may be fixed with respect to this member, in the former case the shaft member 8 will be fixed rigidly to the rotor pylon structure 9, and in the latter case the shaft will be free to rotate in suitable bearings placed in the pylon structure 9. In Figure 7 the shaft member 8 is shown rigidly fixed to the gimbal pin 7 and rotatable in bearings 28 which are formed in the ring 29 which is an integral part of the rotor pylon structure 9. It will be obvious to all those skilled in the mechanical art that a ball and socket joint or any suitable form of universal joint or gimbal ring arrangement could be used to support the rotor mast 6, in any case, the mast must be so mounted that it can be deflected through a relatively small angle in any desired direction. By referring to Figure 4, it will be seen that a control stick 10 of any suitable form is pinned or otherwise rotatably mounted on a fitting 11 which is attached to any fixed portion of the machine. The stick 10 is, in all cases, so mounted that it may be moved in any desired direction about the fitting 11. The upper end of the stick 10 is attached to the lower end of the rotor mast 6 by any suitable form of universal or flexible connection 12. In operation a motion of the stick in a fore and aft direction will cause the rotor mast 6 to move forward and backward and a sideways motion of the stick will, in a like manner, cause a sideways deflection of the rotor mast. Since inclining the rotor mast will cause a corresponding inclination of the rotor thrust vector, it will be obvious that moments about the center of gravity of the ship will be set up thus causing the ship to roll or pitch in any desired direction. It will likewise be obvious to all those skilled in the aeronautical art that such a form of control is absolutely independent of the forward speed as long as the rotor is operating at a sufficient rotational speed to maintain the desired amount of thrust. In addition to the control system just noted, movable vertical surfaces 13, and fixed vertical surfaces 14 are mounted on the rear of the craft in a conventional manner. The surface 13 is connected to any suitable form of control levers, such as pedals 31, and movement of these pedals causes the ship to yaw to the right or left, as desired. The form and arrangement of these control surfaces and the method by which they are actuated is well known to the art and, therefore, does not form a part of this invention. In fact any suitable form of fixed and/or movable vertical surfaces may be used without in any way departing from the spirit of the invention. In addition to the vertical surfaces, horizontal surfaces 15 and 16 are disposed at the rear of the machine, as shown. The surface 16 may be controlled by any suitable form of control system or it may be fixed so that it cannot be moved with respect to the normally fixed surface 15. In either case, these surfaces are conventional in form and arrangement and their mode of construction and operation is well known to the art. They are included to provide additional control and stability particularly in forward motion. Located at any suitable point in the machine but preferably in the nose is a motor 18. This motor may be of any suitable form such as a gasoline or Diesel motor of either two or four cycle construction and may be either liquid or air cooled.

In the preferred form of construction as illustrated in Figures 1, 2, and 3, a blower or impeller 19 is connected by means of a friction clutch 61 and a short shaft 62 to the motor 18. In the modified form of construction as illustrated in Fig. 4, the same form of connecting means are used except in this case the blower or impeller 19 is located near the rear of the fuselage and aft of the occupants. In this case a long connecting shaft 63, which passes between the occupants, is used. The impeller 19 is inclosed in an air duct 20 which is located within the body of the craft. This duct is supplied with an entrance aperture 21 which in Fig. 4 is located at the rear of the craft. It will be obvious, however, that the entrance duct 21 might well be disposed at the front of the machine, as in Fig. 1, or, for that manner, in any desired location. When the impeller 19 is in operation it will cause air to flow into the entrance duct, as indicated by the arrows and thus into a duct system 22. After the air leaves the duct 22 it passes through a plurality of apertures 30 in the rotor head and thus into the hollow blades 2. The air is caused by its own pressure as well as by centrifugal force to move radially outward from the rotor head through the rotor blades, as indicated by the arrows, and is expelled at the tips of the rotor blades through apertures 17 formed in the trailing edge of said blades. It will be obvious to all those skilled in the art that the reactive force resulting from the air leaving the trailing edge of the rotor blades near their tips will cause the rotor system to revolve at a speed depending upon the volume and velocity of said expelled air. It will likewise be obvious that such a form of rotor drive will materially reduce the torque reactions since a high speed blower can be used and a counter torque can be obtained by means of the fixed guide vanes 64. Due to this reduction in the reactive torque, the body of the ship will be prevented from rotating in a direction opposite to that of the rotor system, when the ship is in the air, as is the case with the forms of helicopter where the rotor is driven through a mechanical drive. With reference to the matter of the torque reaction, it should be noted that in the preferred embodiment of the invention, this reaction, provided it is not entirely eliminated by the vanes 64, will not tend to yaw the ship, but will tend to roll it. Since the tilting rotor gives full rolling control at all speeds, no difficulty should be experienced in correcting for any rolling moment imparted to the ship by means of the torque reaction. In fact, in certain cases it may be found desirable to omit entirely the guide vanes 64 and this can be done without in any way departing from the spirit of the invention.

In addition to the various elements that have been previously described, the craft is supplied with a set of landing wheels 24 and supporting struts 25 of conventional form as well as a conventional form of tail wheel 26 and tail wheel support 27. In Fig. 1 the main wheels 24 are shown slightly forward of the C. G. of the ship 23 but they could if desired be located slightly to the rear of the C. G. 23 in which case the tail wheel or support 26 would be located on the forward part of the body near the nose. As both these forms of wheel arrangements are well known in the aeronautical art, it is necessary to illustrate but one of them. In the accompanying drawings the motor 18 is shown ahead of the C. G. 23, although it might, without in any way departing from the spirit of the invention, be located in some other part of the ship. Located in the nose of the ship is a conventional form of propeller 65 which is adapted to be driven by the motor 18 through the medium of a friction clutch 66 of conventional design. The friction clutch 66 for driving the propeller 65 and the friction clutch 61 for driving the blower or impeller 19 are in all respects similar and are so arranged that they may be operated at any time by the pilot. In certain cases particularly when a variable pitch propeller is used, it may be desirable to omit the friction clutch 66 and/or 61 and such omissions may be made without violating the spirit of the invention.

A most important part of the invention resides in the structure which is used to control the flow of the air from the time it enters the entrance aperture 21 until it is expelled from the tips of the rotor blades through the apertures 17. It will be obvious that the duct system must be so constructed that no leakage can occur at any time regardless of the flapping angle assumed by any individual rotor blade and regardless of the angle at which the rotor mast must be tilted.

Figure 6:
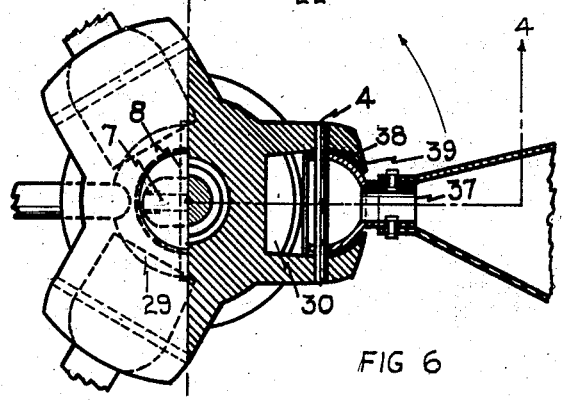
Fig. 6 is a top plan view of the rotor head assembly shown in partial section. The cutting plane in this case is taken along the line 6—6 Fig. 5.

As previously noted the air which is used to propel the rotor is drawn into the body of the craft through any suitable form of aperture such as 21. After entering the duct 21 the air flows through the deflector vanes 64, the passage 20, and through the blower or impeller 19 and thence into the duct 22 which is faired in with the rotor pylon structure 9 or which may serve as an integral part of this structure. The upper part of the duct 22 is so formed as to join in with the gimbal ring 29 or to attach to a sleeve unit 44 of which this ring is an integral or attached part. The sleeve unit 44 has formed on its outer surface a circumferential boss 33 whose surface coincides with the surface of a sphere drawn with geometrical center of the gimbal assembly as a center. Attached to the upper part of the rotor mast 6 in any suitable manner are a plurality of bearings 5 which are mounted in a rotor head assembly 3, this rotor head is supplied with a plurality of passages 30, one for each rotor blade, through which air can flow. The lower part of the passages 30 are so disposed as to be in substantial alignment with the sleeve unit 44. Packing 34 of any suitable material is located around the mast 6 and the rotor head 3, thus preventing any leakage of air around the rotor mast. An extension member 35 is formed on, or attached to, the rotor head at a point adjacent to the outer surface of the apertures 30 and packing 36 of any suitable form and material is attached to this member. The packing 36 is so disposed as to always be in contact with the circumferential boss member 33 thus forming a seal which in conjunction with the seal formed by the packing 34 effectively prevents any air leaking out of the duct system irrespective of the angle to which the rotor mast 6 may be tilted. In order that the air may pass from the rotor head 3 into the hollow blades 2 without leakage or without undue throttling losses the inner end of the blades 2 are formed into the shape of a tube 37 (or they may, if desired, be attached to a tube in any suitable manner) of relatively large inside diameter. The tube 37 has formed or attached to its inner end a hollow ball member 38 which is so disposed as to fit into a suitable socket fitting 39 formed in the rotor hub 3. In order to prevent the individual rotor blades from twisting or otherwise deflecting about their longitudinal axes, in such a way as to change their incidence setting, hinge pins 4 are associated with the rotor head and the inner end of each individual blade. The hinge pins 4 lie in a plane which is substantially at right angles to the central rotor mast or axis 6. It will thus be seen that the individual rotor blades are always constrained to flap in the plane which contains the central axis of the whole rotor system, or in a plane which makes a relatively slight angle with the plane containing this axis. By reference to Fig. 6 it will be noted that the hinge pins 4 are so disposed as to transmit all loads from the individual rotor blades 2 to the rotor head or hub 3 as well as to prevent any twisting of the individual blades about their longitudinal axis, as just noted. By constructing the mechanism in this manner the socket member 39 in the rotor head is relieved of all load and serves the sole purpose of acting as a seal to prevent the leakage of air from the rotor head, and/or from any of the individual rotor blades, at the juncture of said head and said blades. Although this form of construction and arrangement of the pins 4 is to be preferred, since it tends to reduce the weight of the rotor head and also the hinge friction, it will be obvious that the pins 4 (or a pin or any other projecting member) could be formed on, or passed through the ball member 38 and fit into a suitably disposed slot or groove formed in the socket member 39 in such a way as to prevent any rotation of the rotor blades about their individual longitudinal axes.

*Operation*

The operation of the invention is substantially as follows: The motor 18 is started by any suitable means (not shown) by the operator or by an assistant standing beside the machine. The clutch 61 is then engaged thus connecting the motor directly to the blower 19 thereby causing air to be drawn into the inlet duct 21. The air drawn into the inlet duct 21 will pass through the twist vanes 64 into the duct 20 thence through the impeller or blower 19 and into the duct 22 from which duct it passes through the rotor head 3 into the hollow blades 2 from which it is expelled through suitable orifices 17 formed in the trailing edge of the blades at a point near their tips. When it is desired to take the machine off the ground, the pilot simply opens the throttle 41 or, in case a constant speed motor is used, he opens the butterfly valve 40, in either case, the reactive forces caused by the large volume of high velocity air flowing out of the orifices 17 formed in the tips of the blades will cause the whole rotor system to revolve and gain speed until such time as the retarding aerodynamic and friction moments are equal to the moments set up by the reactive forces acting on the rotor blades near their tips. As the rotor gains in speed the individual blades will develop an aerodynamic lift depending upon their angular and linear velocity at any instant relative to the surrounding air, and also upon their shape, contour, and incidence setting. As the rotor speed increases, the individual blades will rotate in an upward direction about their hinges 4 but will be restrained by the centrifugal force, which acts on each individual rotor blade and tends at all times to keep it rotating in a plane substantially at right angles to its axis of rotation, from being deflected to too high an angle. It will thus be seen that the blades will assume an equilibrium position in which they will be upwardly inclined with respect to the horizontal and in this position each individual blade will exert through the hinge 4 or similar fitting a large radial force which is inclined in an upward direction. The horizontal components of the individual blade forces will cancel each other out but the vertical components of these forces will be transferred through the rotor head, pylon, and associated structures to the main body of the machine and will thus lift it from the ground. Either before or after the machine leaves the ground the pilot may cause it to move forward, or for that matter, a rearward, direction by engaging the clutch 66 to the propeller 65 thus causing a component of the total output of the motor to be converted into thrust thereby causing translational motion. In this type of motion or in gliding flight with a dead or throttled motor, or a declutched propeller, the blower clutch 61 can be disconnected which allows the machine to be operated in the same manner as an autogiro, the rotor of which is always kept turning by the external aerodynamic forces acting upon it.

It will be observed that a pitching moment appears whenever the resultant rotor vector is inclined in such a manner as not to pass through the C. G. of the ship. This pitching moment enables the pilot to control the attitude and/or the flight path of the ship. In case the ship is ascending or descending in a substantially vertical path the rotor mast need only be deflected as needed to keep the ship in a proper attitude and during flights of this character, the resultant rotor thrust vector will pass substantially through the C. G. of the ship. In certain cases when the ship is moving forward it will be seen that a pitching moment caused by rotor displacement, as just described, may not be desired and means must be supplied to obtain a pitching moment from another source. The horizontal tail surfaces 15 and 16 are supplied for this purpose and in addition they serve as damping surfaces to prevent any oscillation from building up as a result of gusts or from other causes. The horizontal tail surfaces 15 and 16 are not effective in vertical flight due to the low value of the relative wind and, fortunately, they are not needed under these conditions since complete control can be obtained by proper displacement of the rotor mast. In most cases it is possible to have the surfaces 15 and 16 fixed with respect to the body of the ship but in certain types of constructions it may be desirable to have the surface 16 movable about a horizontal axis 41. When this type of construction is used the pilot is supplied with an additional control lever 42 of any suitable form located at any convenient point in the cockpit of the ship. If the surface 15 is made movable the arrangement of the control members, linkages, etc., is conventional in every respect and is therefore familiar to all those skilled in the art. From the preceding description it will be seen that the pilot may by the proper manipulation of the control column 10, the clutches 61 and 66, and/or the throttle and in some types of construction the auxiliary control lever 42 ascend or descend along any desired path and may also impart to the ship rolling moments of magnitude sufficient to cause the ship to change its lateral attitude with respect to said path. It will be noted that when performing those types of maneuvers in which altitude is lost that the controllability just described is in no wise affected even if the motor is stopped provided the rotor is kept turning by aerodynamic means which will be hereinafter described. In horizontal or climbing flight with the motor in operation the forward speed of the ship may be increased or decreased by changing the pitch setting on the variable pitch propeller 65 or by changing the throttle setting.

Lateral control

In any form of aircraft it is necessary to supply some means for keeping the machine level laterally or inclining it from the level position as desired in order to correct for gusts or for purposes of control. In the ordinary form of fixed wing aircraft control in roll is obtained primarily by the use of ailerons except when the machine is in extreme attitudes of flight. In the invention which forms the subject matter of this application rolling control is effected by moving the control stick or column 10 to the right or left thus displacing the rotor mast 6. It will be seen that whenever the rotor mast 6 is displaced that the line of action of the resultant rotor thrust vector will be displaced to one side of the C. G. of the ship thus setting up a rolling moment the magnitude of which depends solely on the magnitude of the resultant rotor thrust vector and the degree of displacement of said vector. Since complete control of the ship is dependent only on rotor thrust, it will be seen that safe operation is in no wise adversely affected by a dead motor and/or a low forward speed so long as the rotor speed and thrust do not materially decrease.

In addition to the rolling moment set up by a lateral displacement of the rotor axis a side force appears which tends to cause the ship to move to one side. If desired the ship can be flown sideways under the action of this side propulsive component but if it is not desired to move sideways this effect can be compensated for by the use of the rudder which can be so deflected as to cause the ship to turn into the direction in which it is at any instant moving. Even if the rudder 13 is not used for this purpose the side velocity will normally be low unless sideslipping is resorted to since the relatively large fin area aft of the C. G. will cause the ship to line up into the relative wind before any very great side velocities build up. It will thus be seen that by a proper disposition of vertical fin surfaces that the movable rudder surface 13 may for certain types of operation be dispensed with and if desired such a form of construction may be used without departing from the spirit of the invention. In the form of construction in which the vertical rudder 13 is fixed, sideslipping or side travel of the machine will be limited to relatively low velocities and any roll imparted to the machine will at once generate a yaw of magnitude sufficient to maintain at all times a properly banked turn. In the form of construction in which a movable rudder is used it is necessary for the pilot to apply the correct amount of rudder so that a properly banked turn can be made whenever the ship is rolled, in this respect the operation is identical with the conventional form of aircraft. It will be obvious to all those skilled in the art that the speed of rotation of the blades and therefore their lift and consequent effectiveness will depend upon the momentum (MV) of the air or other fluid which is expelled from their tips. It will be seen by reference to the above equation that in order to obtain a given value of the momentum we have the choice of one of two methods.

1. A small volume of fluid expelled at high velocity from the tips of the blades.
2. A large volume of fluid expelled at relatively low velocity from the tips of the blades.

Whereas Case 1 might be made to produce the same reactive force as Case 2, an important distinction between them exists. To anyone familiar with the art it is at once apparent that Case 1 would be so inefficient as to be inoperable, whereas Case 2 would afford efficiency great enough to make this form of rotor drive operable and successful provided, the passages conducting the air to the blade tips be as large as possible in order to make the losses in these passages a minimum. It will thus be seen that the relative sizes of the air duct passages throughout the whole system as well as the size of the impeller ducts located in the tips of the blades have an important, and in fact, a vital effect on the success and operativeness of the invention. In the invention which forms the subject matter of this application due consideration has been given to this factor and considerable inventive effort has been expended in order to design a low pressure, low velocity system, handling a large volume of air per unit of time.

*Powerless flight*

From the previous discussion it is obvious that the control, stability, and trim of the craft can be maintained in a satisfactory degree regardless of its forward speed or the condition of throttle setting of the motor so long as the rotor continues to turn at its proper speed. As articulated rotors of the type described and shown in this application are in daily use on autogiros and their principles of operation are well known to the art, a prolonged discussion of them will not be given in this application. Diagrams showing the combination of aerodynamic forces which cause continuous substantially constant rotation of an articulated rotor are shown in U. S. Patent No. 1,975,118 and an exposition of pertinent portions of the theory of the articulated rotor system is given in U. S. Patent No. 1,993,701 and in numerous scientific publications. Many thousands of hours of flight have shown that a properly designed articulated rotor system of a type such as is illustrated in the accompanying drawings will without the application of power other than that obtained from the surrounding air when the rotor is moving through it, possesses the following characteristics. Such a rotor system will 1. Autorotate at a substantially constant speed for a given load regardless of the attitude assumed by the ship and regardless of its air speed or direction of flight.

2. Be substantially free from any torque reaction when it is autorotating.

3. Be substantially free from any tendency to roll during forward flight due to the difference in airspeed on the advancing and retreating blades.

4. Be substantially free from all gyroscopic effects.

5. Be substantially free from cumulative vibrations.

6. Be only slightly affected by gusts or sudden changes in its attitude, direction of motion, and/or its velocity with respect to the surrounding air.

7. Be substantially stable in its operation at all times.

8. Be responsive to comparatively slight forces tending to change the direction of the axis about which it is rotating.

Attention is particularly called to the broad character of this invention which makes possible for the first time slow speed flight in any direction in a heavier than aircraft under full control. It will be understood by all those skilled in the art that certain changes can be made in the invention, requiring only the exercise of mechanical skill, which will not in any way affect the basic character of the invention. We, therefore, in view of the basic character of our invention claim broadly as follows:

1. A rotor head assembly for rotating wing aircraft comprising in combination, a main duct, rotor mast universally mounted in the center of said duct near its upper end, a rotor hub mounted in bearings on said rotor mast, passages through said rotor hub and in line with said duct, pivotally mounted hollow rotor blades attached to said rotor hub and communicating with the passages therein, means comprising an axial type impeller for supplying air under pressure thru said duct and rotor hub to the hollow rotor blades aforementioned, and a prime mover adapted to operate said axial type impeller, counter-torque means comprising a plurality of radially disposed vanes located in the air stream of the impeller and co-axial therewith, impeller apertures at the end of the pivotally mounted hollow rotor blades aforementioned, whereby air under pressure may pass through the impeller, the duct, into the rotor blades and out of the apertures in said blades, thus causing rotation of the rotor system about the central rotor mast.

2. An aircraft, a rotor mast mounted thereon, a rotor head mounted on said mast and fully rotatable with respect thereto, a plurality of blades hinge-jointed to said rotor head and adapted to flap in a substantially vertical plane under the action of centrifugal and aerodynamic forces, duct passages formed in said blades, duct passages formed in said rotor head and connecting with the duct passages in said blades, axial blower or impeller means mounted in the body of said aircraft, a plurality of fixed radial counter-torque vanes disposed in the airstream of said impeller and co-axial therewith, and entrance opening to the inlet side of said axial impeller, and duct means connecting the outlet side of said axial impeller to the rotor head, a prime mover disposed in the body of the aircraft and adapted to drive said blower or impeller; an airscrew for forward propulsion connected to said prime mover, exit orifices formed near the tips of each rotor blade whereby when the prime mover is in operation and driving the axial blower or impeller, air will be drawn into the body of the aircraft, forced through the rotor head into the rotor blades and expelled near the tips of said blades, thus causing a rotation of said blades as a result of the reactive force of the air expelled therefrom.

3. A device as in claim 2, including damper means under control of the pilot for controlling the flow of air to the rotor blades and clutch means between the prime mover and the axial type impeller and between the prime mover and the propulsive airscrew, said combination of means resulting in a fully controllable heavier than air aircraft capable of vertical ascent and descent.

MONTGOMERY KNIGHT.
THOMAS E. MOODIE.